(12) United States Patent　　(10) Patent No.: US 7,492,757 B2
Huang　　(45) Date of Patent: *Feb. 17, 2009

(54) HYBRID PACKET-SWITCHED AND CIRCUIT-SWITCHED TELEPHONY SYSTEM

(75) Inventor: Lisheng Huang, Carrollton, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/033,114

(22) Filed: Feb. 19, 2008

(65) Prior Publication Data

US 2008/0137651 A1　　Jun. 12, 2008

Related U.S. Application Data

(63) Continuation-in-part of application No. 08/575,433, filed on Dec. 20, 1995, now Pat. No. 7,336,649.

(51) Int. Cl.
*H04L 12/66* (2006.01)
(52) U.S. Cl. ...................................... 370/352; 370/401
(58) Field of Classification Search ................ 370/352, 370/353, 354, 355, 356
See application file for complete search history.

(56) References Cited

U.S. PATENT DOCUMENTS 5,726,984 A * 3/1998 Kubler et al. ............... 370/349
6,243,373 B1 * 6/2001 Turock ....................... 370/352
7,336,649 B1 * 2/2008 Huang ....................... 370/352

* cited by examiner

*Primary Examiner*—Chi H. Pham
*Assistant Examiner*—Phuc Tran

(57) ABSTRACT

A hybrid telephony system with packet switching as well as circuit switching optimizes utilization of transport networks, and is accessible from any conventional telephone set. A call originating from a circuit-switched network is passed through a gateway computer to a backbone packet-switched network, and then through a second gateway computer to a second circuit-switched network where it terminates. The voice of both the originating party and the terminating party is converted to data packets by the near-end gateway computer and then converted back to voice by the far-end gateway computer. In an alternative scenario, the originating party uses a computer on the packet-switched network, which replaces the originating circuit-switched network, and the originating computer. Powered by CPUs, DSPs, ASICs disks, telephony interfaces, and packet network interfaces, the gateway computers may have media conversion modules, speech processing modules and routing resolution modules, and are capable of translating telephony call signaling as well as voice between circuit-switched and packet-switched networks. Optionally, the gateway computers may also have analog trunking modules, MF and DTMF digit modules and special services modules, in order to support analog circuit-switched networks and secure telephone calls.

20 Claims, 5 Drawing Sheets

(1) The caller makes a long-distance call by dialing a destination address (callee's telephone number) through a Local Exchange Carrier (LEC) from his/her dedicated telephone such as home phone or office phone for which a routing configuration to a Gateway Computer (GC) is preset with the LEC. The LEC routes the call to the GC. The caller's address (caller's telephone number) is usually passed to the GC by the LEC along with the destination address.

(2) The originate GC authorizes the call by checking the caller's account information through internal databases; It also resolves the routing using the dialed destination address.

(3) The originate GC then sends a control message the terminate GC, along with both parties addresses; if the terminate GC does not know where to route the call or does not have the resource to serve the call, it responds with a negative acknowledgment and an alternate terminate GC is searched for, or the caller is so informed.

(4) The terminate GC dials out to the callee through his/her LEC.

(5) If the call proceeds successfully through the LEC, the terminate GC sends an acknowledgment back to the originate GC (the unsuccessful, mostly busy, scenario is not shown);

(6) The originate GC then passes the status back to the caller through the LEC, the effect being a ring back tone;

(7) The callee answers the call;

(8) The terminate GC passes this state change to the originate GC which may start billing;

(9) The callee starts the conversation by greeting the caller;

(10) The terminate GC continuously digitizes all the signals from the callee, possibly encrypts, compresses, and packs into packets the data, and sends the packets over the network to the originate GC;

(11) The originate GC continuously unpacks, decompresses, and possibly decrypts, the data, and converts the data back to voice to the caller over the LEC;

(12) The same process is performed for the caller's voice, in the opposite direction of the one described in steps 9 through 11; the processing in both directions supports the conversation between the two parties in the call.

Fig. 7

HYBRID PACKET-SWITCHED AND CIRCUIT-SWITCHED TELEPHONY SYSTEM

TECHNICAL FIELD

This invention relates to telecommunication systems, and, more particularly, to a hybrid telephony system comprising both circuit-switched and packet-switched networks.

BACKGROUND OF THE INVENTION

With the extensive use of personal computers and other data processing facilities both at home and in the office, there are great needs for improved data communications. Hence, packet-switched public networks are being rapidly developed and increasingly interconnected with each other. These existing packet networks have mostly been serving data communications traffics as opposed to voice telephony.

Voice and data traffic, have significantly different characteristics. Voice is typically continuous in one direction for relatively long intervals and tolerant of noise, but sensitive to variations in delay. Data is bursty and sensitive to noise errors, but tolerant of moderate delays and variations in arrival times.

Two fundamental different switching techniques have therefore been traditionally applied to voice and data transmissions. Circuit switching, where switched connections between users are dedicated for call duration, is the basis of the present-day switched voice telecommunication network. On the other hand, packet switching, where data packets from multiple terminals share a single, high-speed line and are switched based on logical channel numbers attached in the packets, is being rapidly adopted as the basis of the present-day switched data telecommunication network.

Packet switching was pioneered in the ARPANET network of the U.S. Department of Defense, and has been widely implemented in a variety of public data networks. However, most public telephone systems are fundamentally circuit-switched, which is an inherently inefficient system because typically each subscriber utilizes the allotted channel for a relatively small amount of the total connection time. Furthermore, the number of simultaneous circuit-switched communications are limited because only a portion of the available bandwidth is allocated to such communications.

Another disadvantage is that, because circuit switching is centralized, a failure at the switching center can result in failure of the entire network. A further disadvantage of circuit-switched telephony is due to the proprietary nature of the telephony switches currently in use. Because the switching software is often proprietary and not shared with other manufacturers, the cost and delay in adding and interfacing new services are often frustrating and installation prohibiting.

It has been proposed, that packet-switched techniques replace, or at least be combined with some, circuit-switched telephony so that the entire system bandwidth may be made available to each subscriber on a random access basis. For this purpose, there are currently emerging software products that make use of the Internet, which is a constantly changing collection of interconnected packet-switched networks, for telephony. VOCALTEC software provides half-duplexed long-distance telephone capability through the Internet. Camelot Corp is another entry in the Internet telephone business with a MOSAIC front end software that supports full-duplexed voice conversation. These products offer an alternative to long-distance analog telephone service for the subscribers by digitizing and compressing voice signals for transport over the Internet.

Some limitations of this type of hybrid telephone system are: (1) Both the caller and the callee must have computers, (2) they must have sound systems on their computers, (3) they must have full Internet access, (4) they must have both purchased compatible software, (5) they must both connect to the Internet at the time the call is made, and (6) the telephony software must be in execution at both ends at the same moment. These limitations translate into a considerable amount of investment in hardware and software, which has to be made by the individual subscribers to implement such a telephony system. The last limitation also means that the calls have to be scheduled in advance in most cases, which clearly does not provide the convenience of conventional telephone calls. An additional problem with such software products is that the performance is constrained by the capabilities of each computer, such as processor speed, memory capacity, and modern functional features.

SUMMARY OF THE INVENTION

In accordance with the principles of the present invention, a hybrid packet-switched and circuit-switched telephony (HPCT) system routes a telephone call mostly through packet-switched networks, except for the caller and callee ends where the subscriber telephone sets are directly connected to the circuit-switched networks of the respective local exchange carriers (LEC's). A gateway computer (GC) or equivalent interconnects the packet-switched network to each of the circuit-switched networks, and converts voice signals into data packets and vice versa, and resolves the call destinations while routing the packets.

In this invention, the GC's are preferably managed by the telephony service provider, as opposed to the end-user. Because the GC's are a set of resources shared by many subscribers, they can be managed with higher efficiency and utilization than calls managed by a subscriber's personal computer. By incorporating the HPCT system into the current long-distance telephony, lower cost of communication can be achieved due to better utilization of available channels by packet-switched networks over purely circuit-switched networks, and the benefits of packet switching can be made available to many subscribers without significant subscriber investment Moreover, there can be special hardware components added to the GC to improve performance, such as a DSP or an ASIC based compressor, decompressor, speech recognizer, encryptor and decryptor, etc., which would be much less cost-effective to added to each home computer.

Additional advantages of the hybrid packet and circuit switched telephony of the invention are; (1) lower cost of transport due to better circuit utilization as compared to a pure circuit-switched network; (2) availability to any subscriber at no initial investment as would be required by pure packetswitched telephony, such as requiring the purchase of a multimedia personal computer, Internet access, and Interact telephony software; (3) the potential for quickly adding intelligent services due to computer based telephony, such as a caller's personalized speed dialing list, a callee's personalized virtual destination number, and integration with electronic-mails; and (4) avoidance of the inconvenience of current packetswitched telephony using Internet phones, which includes the burden of learning each callee's IP address and carrying a portable computer when traveling or commuting.

BRIEF DESCRIPTION OF THE DRAWINGS

The features of the invention and its objects and advantages may be further understood from the detailed description below taken in conjunction with the accompanying drawings, in which.

DESCRIPTION OF THE PREFERRED EMBODIMENT

With reference to FIGS. 1 to 3b, a hybrid packet-switched and circuit-switched telephony (HPCT) system according to a preferred embodiment of the present, invention comprises originating and terminating gateway computers (GC's), which interconnect corresponding circuit-switched networks with a packet-switched network for voice and data communications.

Figure 1:
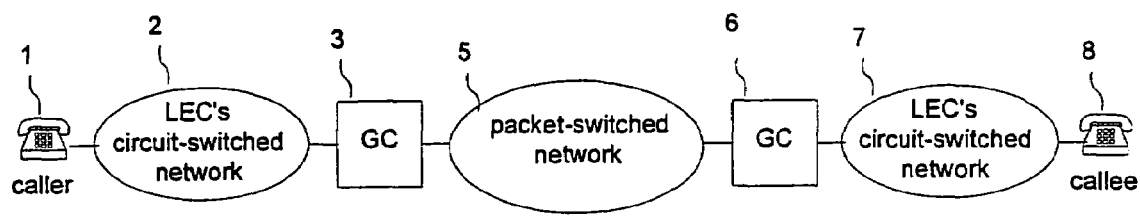
FIG. 1 is a block diagram showing a first embodiment of the present invention.
Figure 2:
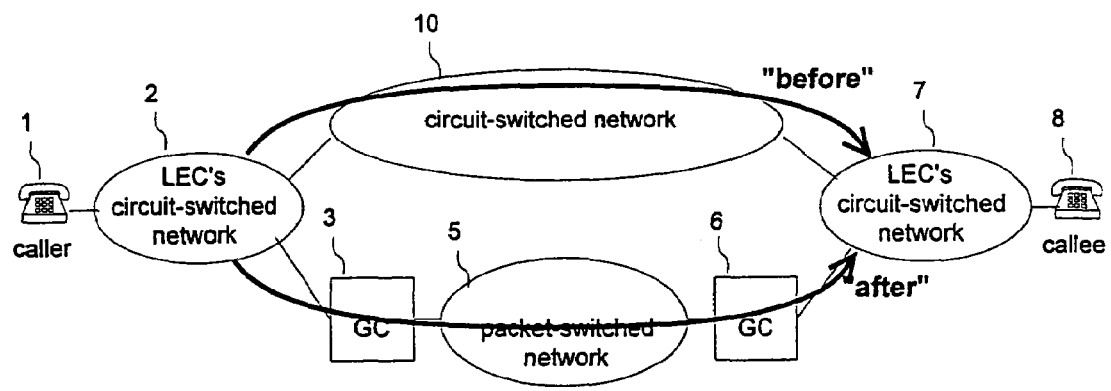
FIG. 2 is a block diagram illustrating a voice telephony system before and after incorporating the first embodiment of the present invention.

As shown in FIG. 1, an originating (local) telephone set 1 is connected with an originating (local) GC 3 through a circuit-switched network 2 of an originating local exchange carrier (LEC). At the other end of the telephony system, a terminating (remote) telephone set 8 is connected with a terminating (remote) GC 6 through a terminating (remote) circuit-switched network 5 of a terminating (remote) LEC 7. A packet-switched network 5 is provided for communications between originating GC 3 and terminating GC 6. FIG. 2 shows diagrammatically how a conventional circuit-switched network 10 is replaced by the two GC's 3 and 6 and the packet-switched network 5.

Figure 3A:
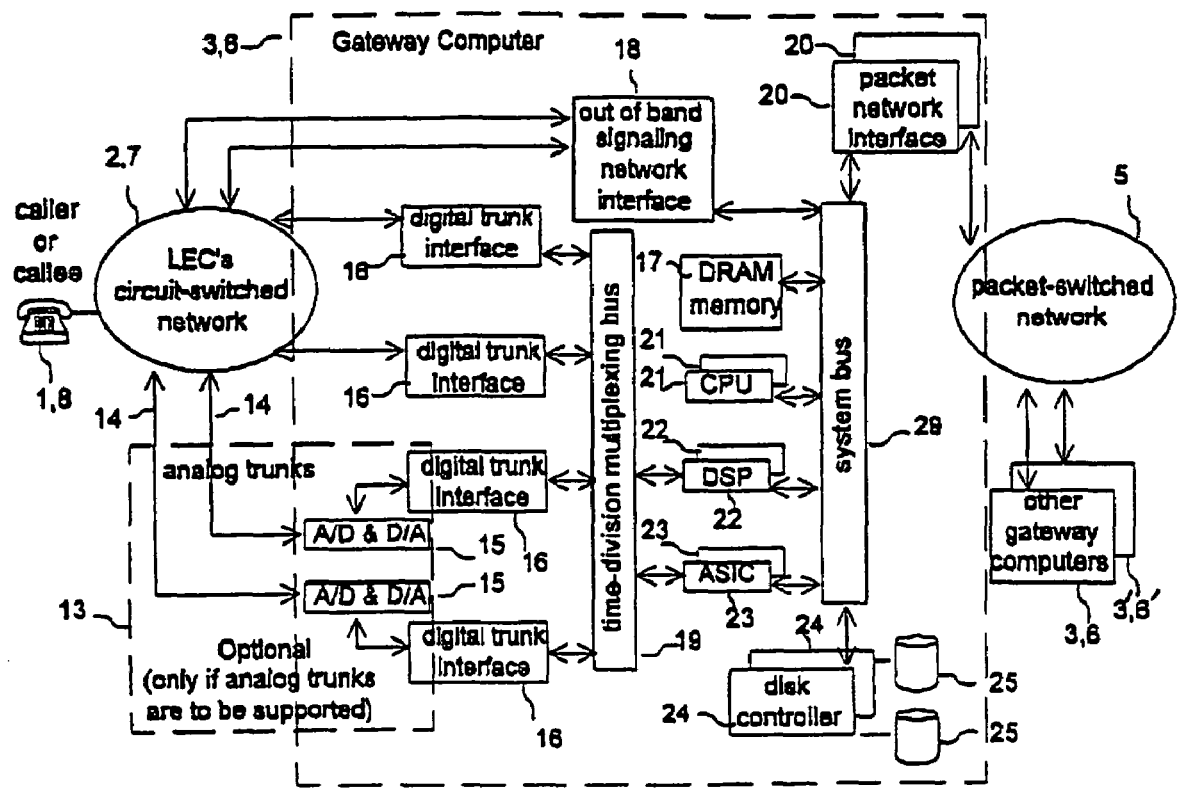
FIG. 3a is a system block diagram of the first embodiment illustrating structural components of the gateway computer.

FIG. 3a shows one of the GC's in more detail. Preferably both the originating and terminating GC's include a plurality of digital trunk interfaces 16, a Random Access Memory (RAM) 17, a signaling network interface 18, a non-blocking Time-Division Multiplexing (TDM) bus 19, a plurality of packet network interfaces 20 one of which is connected through the packet-switched network 5 to other gateway computers 3' and 6', a plurality of Central Processing units (CPU's) 21, a plurality of Digital Signal Processors (DSP's) 22, a plurality of Application-Specific Integrated Circuits (ASIC's) 23, a plurality of disk controllers 24 with disks 25, and a system back plane in the form of either a shared bus or cross connection 29. An analog subsystem 13, comprising analog trunks 14 and AID and DIA converter pairs 15, is needed only if analog trunks are to be supported by the GC, and therefore may be considered optional.

Figure 3B:
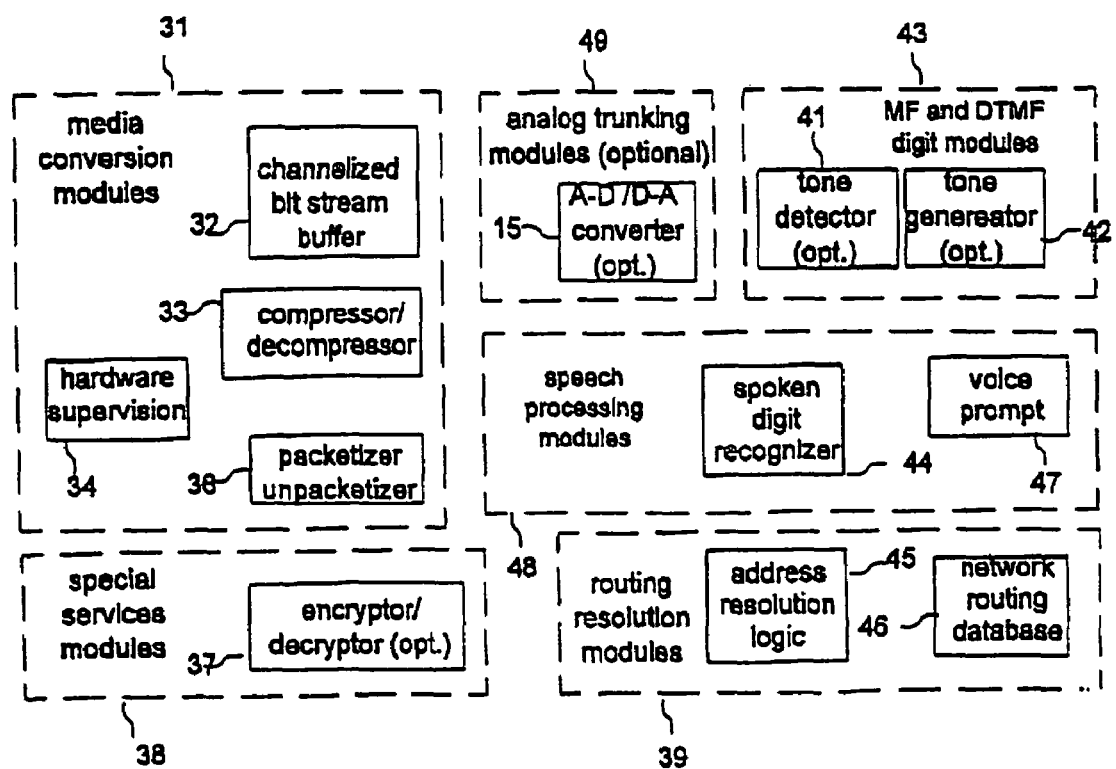
FIG. 3b is a system block diagram of the first embodiment illustrating functional components of the gateway computer.

FIG. 3b shows the functional components of GC's 3 and 6 arranged into media conversion modules 31, optional analog trunking modules 49, MF and DTMF digit modules 43, speech processing modules 48, routing resolution modules 39, and special services modules 38. Speech processing modules 48 include a spoken digit recognizer 44 implemented with DSP 22, and a voice prompt playback unit 47 also implemented with DSP 22. Routing modules 39 include an address resolution logic 45 implemented with CPU 21, and a network routing database 46 also implemented with CPU 21 and possibly shared with other GC's in a distributed manner. MF and DTMF digit, modules 43 include a tone detector 41 implemented with DSP 22 or ASIC 23 for both user keypad dialing and in-band signaling if needed, and a tone generator 42 also implemented with DSP 22 or ASIC 23 for prompting and in-band signaling if needed. Media conversion modules 31 include a plurality of channelized voice bit stream buffers 32 implemented with DSP 22 or ASIC 23, a compressor/decompressor 33 also implemented with DSP 22 or ASIC 23, hardware supervision logic 34 implemented with digital trunk interfaces 16, and a packetizer/unpacketizer 36 implemented with CPU 21, DSP 22 or ASIC 23. Special services modules 38 may include an encryptor/decryptor 37 also implemented with CPU 21, DSP 22 or ASIC 23. As indicated in the preceding paragraph, the analog trunking modules 49, which include the plurality of analog-to digital and digital-to-analog converter pairs 15, are optional. Digit modules 43 and special services modules 38 are also optional.

With GC's 3 and 6 having these functions, the expected voice compression ratio may reach 25:1, or even better with emerging technology. The presence of the usual amounts of silence in voice communications may double that ratio to 50:1, making the HPCT even more efficient and cost-effective. To achieve even, further compression, ratios, special compression schemes may also be used, which are expected to be both tolerated by the human ear and used to facilitate a low cost of the service. The HPCT may provide a virtual end-to-end connection. In the absence of such a virtual connection, the buffering mechanism at the receiving end can recover the stream of voice from packets arriving with the variable delay introduced by the packet-switched network.

Figure 4:
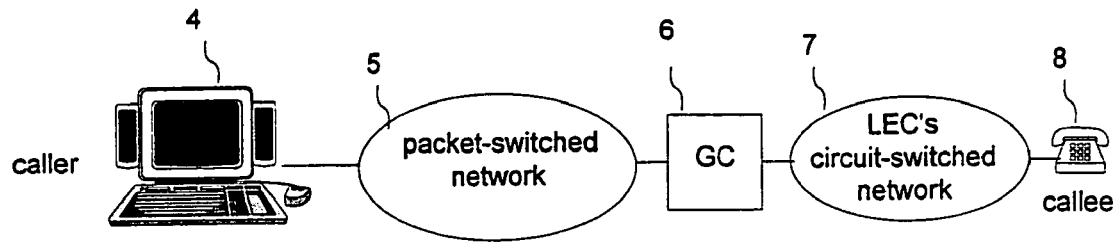
FIG. 4 is a block diagram showing a second embodiment of the present invention.

The HPCT telephony network of FIG. 1, along with its associated service protocols, is symmetric. However, sometimes a caller may have a multimedia-capable computer and a packet-switched network connection, thereby enabling advanced services or features. However, if the callee does not have (a) a terminating multimedia computer, (b) direct access to the packet-switched network, or (c) a compatible packet-switched telephony application currently running on the terminating computer, then the call can not be completed over just a packet-switched network. In this case, a terminating circuit-switched LEC 7 supported by a terminating GC 6 may be used in the same way as in the first embodiment of the present invention, but the telephony system will have an asymmetric configuration as shown in FIG. 4.

In this system, the caller's multimedia computer 4 will run a digital communications program comparable to an originating GC's protocol and therefore will serve as the originating GC from the view point of the packet-switched network 5 and the terminating GC 6, except the billing and validation of the caller may be performed by the terminating GC 6 based on the caller's access point to the packet-switched network. Similarly, where the callee has a multimedia capable computer and a packet switched network connection but the caller does not, the telephony system of the invention may have an asymmetric configuration that is the reverse of the FIG. 4 configuration.

On the other hand, where the HPCT utilizes gateway computers at both ends of the packet-switched network, each GC provides a set of resources that are shared by many users and thus achieves much higher utilization in the telephony than a personal computer. Optimization of performance can be achieved by using Digital Signal Processors (DSP's) or Application Specific Integrated circuits (ASIC's). Furthermore, the users do not have to make a large investment, operate special computer equipment and programs, or schedule calls in advance. In fact, as described below relative to FIGS. 5 and 7, the users may not tell any difference between using the HPCT and using their regular long-distance services, except for a much lower cost.

Considering the 50:1 compression ratio discussed above, the utilization of the circuits in circuit-switched telephony can be only 1/50 as efficient as that of the HPCT; in other words, the cost of the former can be as much as 50 times higher than that of the HPCT. Another important problem with circuit-switched telephony is the proprietary nature of the telephony switches which are the foundation of this telephony. Because switch software development is only done by the manufacturers, the cost and delay in adding new services are often frustrating and prohibiting. The HPCT, however, is based on general-purpose computers with open architecture, which can open up development and bring very cost-effective new services in a much shorter time frame.

The packet-switched network 5 of the HPCT system can be one of many types of packet-switched public data networks, such as X.25 or the emerging Asynchronous Transfer Mode (ATM) network. The ATM network is a special packet-switched network with low delay and low delay deviation, in which data is formatted into special types of packets, referred to as "cells", to achieve fast-switching. Accordingly, ATM networks are sometimes referred to as having a third type of networking, namely "cell-switched networking". A caller can use the HPCT system as an alternative long distance telephony service ("charge service"), or the caller can use it as his/her primary long distance telephony service ("dedicated service"). Charge service can be reached from any telephone while dedicated service can be reached only from a subscriber's dedicated telephone, such as a home phone or office phone. The alternative service is referred as "charge service" because the caller does not need to have a dedicated telephone account with the service provider: instead, the authorization is via a credit card or calling card inquiry.

Figure 6:
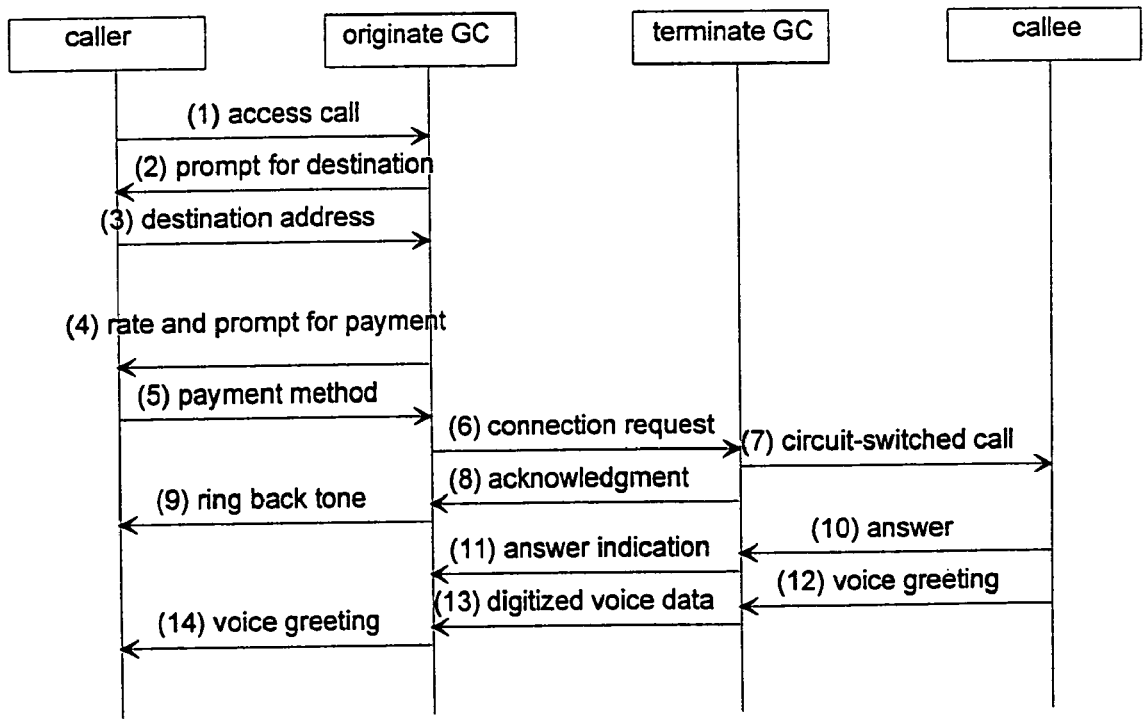
FIG. 6 is a sequence diagram of the call signaling for providing the charge call of FIG. 5; and, FIG. 7 is a flow diagram of the calling process for providing a call from a caller's dedicated telephone in accordance with the present invention.
Figure 5:
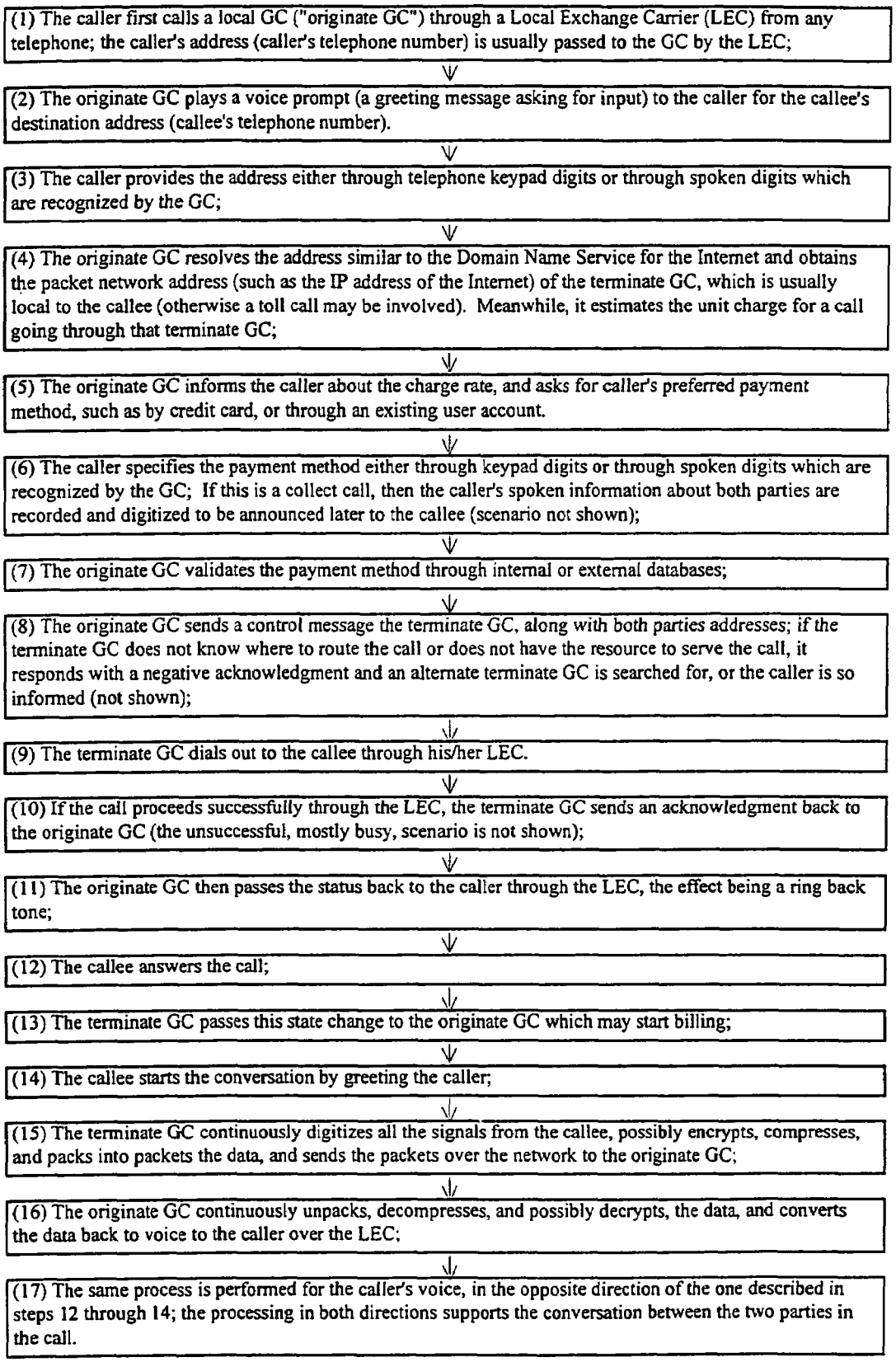
FIG. 5 is a flow diagram, of the calling process for providing a charge call in accordance with the present invention.

To implement the charge service and the dedicated service, the invention provides two respective protocols for processing calls within the hybrid telephony system. The first protocol is for the charge service and is illustrated in FIGS. 5 and 6. The process of this protocol includes the following steps: (1) The caller first calls a local originating GC through a circuit switched originating LEC from any telephone, and the caller's address (caller's telephone number) is relayed to the originating GC by the originating LEC. (2) The originating GC plays a voice prompt (a greeting message asking for input) to the caller asking for the callee's destination address (callee's telephone number). (3) The caller provides the address either through telephone keypad digits or through spoken digits which are recognized by the originating GC. (4) The originating GC resolves the call routing information in a manner similar to the Domain Name Service for the Internet, obtains the packet network address (such as the IP address of the Internet) of the terminating GC, which is usually local to the callee (otherwise a toll call may be involved), and estimates the unit charge for a call going through, that terminating GC. (5) The originating GC informs the caller about the charge rate, and asks for the caller's preferred payment method, such as by credit card, or through a prearranged calling card account. (6) The caller specifies the payment method either through keypad digits or through spoken digits which again are recognized by the originating GC (if this Is a collect call, then the caller's spoken information about both parties is recorded and digitized to be announced later to the callee). (7) The originating GC validates the payment method through an internal or external database. (8) The originating GC sends a control message to the terminating GC, along with both party's addresses and, if the terminating GC does not know where to route the call or does not have the resources to serve the call, it responds with a negative acknowledgment and an alternative terminating GC is searched for and selected, or the caller is informed that the call can not be routed at that moment. (9) The terminating GC dials out to the callee through a circuit switched terminating LEC using the destination address it obtained from the originating GC. (10) If the call proceeds successfully through the terminating LEC, the terminating GC sends an acknowledgment back to the originating GC (or if the call proceeds unsuccessfully, such as due to busy telephone lines, the terminating GC sends this status to the originating GC in the form of a busy message). (11) The originating GC then passes the status of the acknowledgment back to the caller through the originating LEC, the effect being a ring back tone (or a busy tone). (12) The callee answers the call. (13) The terminating GC passes this state change to the originating GC, which may begin billing at that time. (14) The callee starts the conversation by greeting the caller. (15) The terminating GC either receives the digitized voice data stream over a digital trunk or continuously digitizes all the voice signals over an analog trunk from the LEC which the callee is connected to, and, after possibly encrypting and compressing, packetizes the data into packet form, the packets then being sent over the packet-switched network to the originating GC. (16) The originating GC, after possibly rearranging the packets to maintain proper packet order, unpacketizes the received data and, after possibly decompressing and decrypting, optionally converts the digitized data back to the voice signal if the connection with the LEC to 5 which the caller is connected is analog. The digital, or voice signal is then routed to the caller over the circuit-switched network of the originating LEC. (17) The same process as described in steps 14 through 16 is performed for the caller's voice in the opposite direction. The resulting processing in both directions supports the conversation between the two parties participating in the call.

Each GC preferably provides out-of-band signaling, and the call signaling sequence for providing the charge call of FIG. 5 will now be described with reference to FIG. 6. (1) The caller's telephone number is sent to the originating GC to access a call. (2) The originating GC prompts for a destination address, such as by a dial tone. (3) The caller inputs the callee's address, such as by dialing the callee's telephone number. (4) The originating GC may provide a voice message regarding rate, and prompts for a payment method, such as by a special tone or by a voice message. (5) The caller inputs the desired method of payment, such as keypad numbers corresponding to a credit card. (6) The originating GC validates the payment method and then sends a connection request to the terminating GC. (7) The terminating GC dials the callee through the terminating LEC. (8) Depending on whether the callee's telephone is available or busy, the terminating GC sends a corresponding acknowledgement to the originating GC. (9) Depending on whether the callee's telephone is available or busy, the originating GC sends a ring back tone or a busy signal to the caller's telephone. (10) If the callee answers the telephone, an off-hook signal is sent to the terminating GC. (11) The terminating GC then sends an answer indication to the originating GC, which starts billing and sets up the in-band routing for both digitized voice data and analog voice transmission. (12) At this stage, either the callee or the caller may initiate the conversation. If initiated by the callee, the callee's telephone sends the voice greeting to the terminating GC. (13) The terminating GC either receives digitized voice data in a bit stream from the terminating LEC or digitizes the analog voice, and may also perform the additional functions previously described, and then sends the digitized voice data to the originating GC. (14) The originating GC converts the voice data to analog voice by performing the functions previously described, and sends the analog voice to the caller.

The second protocol is for the dedicated service on the HPCT telephony system of the invention and is shown in FIG. 7. The process of this protocol includes the following steps: (1) The caller initiates a long-distance call by dialing a destination address (callee's telephone number) through the circuit-switched network of an LEC from his/her dedicated telephone, such as a home phone or office phone, for which a routing configuration to an originating GC is present within the LEC. The LEC routes the call to this GC, and the caller's address (caller's telephone number) is passed to the GC by the LEC, along with the destination address. (2) The originating GC authorizes the call by checking the caller's account Information, through an internal database or may communicate with a centralized database for the account information, and it also resolves the call routing Information using the dialed destination address, (3) The originating GC then sends a control message to a terminating GC, along with both party's addresses. If the first terminating GC does not know where to route the call or does not have the resources to service the call, it responds with a negative acknowledgment and an alternate terminating GC is searched for and selected, or the caller is informed of the negative acknowledgement. (4) The terminating GC dials out to the callee through the circuit-switched network of the terminating EEC. (5) If the call proceeds successfully through the terminating LEC, the terminating GC sends an acknowledgment back to the originating GC (the handling of the unsuccessful, most likely busy, scenario is similar to that in the first protocol). (6) The originating GC then passes the status back to the caller through the originating EEC, the effect being a ring-back tone. (7) The callee answers the call. (8) The terminating GC passes this state change to the originating GC which may start charging. (9) The callee initiates the conversation by greeting the caller. (10) The terminating GC either receives digitized voice data in a bit stream from the terminating EEC or continuously digitizes all the voice signals from the callee, possibly encrypts and compresses, and packetizes the data into packets, the packets then being sent over the packet-switched network to the originating GC. (11) The originating GC, after possibly rearranging the packets to maintain, proper packet order, unpacketizes the data, possibly decompresses and decrypts, and optionally converts the digitized data back to the voice signal if the connection with the originating EEC is analog. The digital or voice signal is then routed to the caller over the circuit-switched network of the originating LEC. (12) The same process described in steps 9 through 11 is performed for the caller's voice, except in the opposite direction. This processing in both directions supports the conversation between the two parties participating in the call.

While the present, invention has been described in connection with a system having a circuit-switched network, in the form of both a digital and an analog local exchange carrier (LEC) serving analog telephone sets, it is likely that there are many instances where only the digital network interface is needed to connect to the LEC. With a digital, circuit-switched network, the configuration of the corresponding GC's is simplified since it is no longer necessary for the data manipulator to convert the voice signal into digital data, and vice versa.

From the foregoing, it can be seen that the present invention provides an improved telephony system which effectively integrates voice and data in a hybrid circuit-switched and packet-switched telephony network, while ensuring real-time high quality voice communication and calling services with low transmission and access costs. By utilizing gateway computers of telephony service providers to route calls between circuit switched and packet-switched telephone networks, HPCT provides the benefits of packet switching to any telephone subscriber, with none of the substantial initial investments required by pure packet-switched telephony. The potential for vastly increased intelligent services due to computer based telephony, such as caller's personalized speed dialing list, callee's personalized virtual destination number, integration with electronic mails, and many others, allows for even further enhancement of the HPCT system. Furthermore, the HPCT system, which is based on general purpose computers with open; architecture, can open development of a host of new services and make them cost-effective in a much shorter time than would be required, for complete conversion from conventional circuit-switched networks to entirely packet-switched networks.

While this invention has been described in the context of preferred embodiments comprising at least one circuit-switched network of an EEC, It should be clear that the principles of the invention will work equally well with other telecommunications networks and with variations of the preferred embodiments. These and many other modifications and alternatives are possible and will occur to those skilled, in the art who become familiar with the present invention. Such modifications and alternatives are intended to be within the scope of the invention as defined by the claims set forth below.

I claim:

1. A telecommunications system comprising:
   an originating circuit-switched network for providing originating signals in response to voice input,
   an originating gateway computer for converting said originating signals into digital data packets,
   a terminating gateway computer that accepts out of band signaling and converts said digital data packets into terminating signals,
   a terminating circuit-switched network for providing voice output in response to said terminating signals, and
   a packet-switched network for transmitting said digital data packets from said originating gateway computer to said terminating gateway computer, at least one of said originating gateway computer or said terminating gateway computer comprising a component for routing said digital data packets through said packet-switched network from said originating gateway computer to said terminating gateway computer:
   wherein said terminating circuit-switched network is capable of providing first return signals to said terminating gateway computer in response to return voice input,
   wherein said terminating gateway computer comprises a component for converting said first return signals into return packets of return digital data,
   wherein at least one of said originating gateway computer or said terminating gateway computer comprises a component for routing said return packets through said packet-switched network from said terminating gateway computer to said originating gateway computer, and wherein said originating gateway computer comprises a component for converting said return packets into second return signals.

2. A telecommunications system according to claim 1, wherein said terminating gateway computer comprises a terminating buffer component for storing said digital packets prior to the conversion thereof into said terminating signals.

3. A telecommunications system according to claim 2, wherein said terminating gateway computer further comprises a component for rearranging said stored digital packets to maintain a proper packet order.

4. A telecommunications system according to claim 1, wherein said routing component provides said routing in response to dialed digits.

5. A telecommunication system according to claim 1, wherein said routing component provides said routing in response to spoken digits.

6. A telecommunications system according to claim 1, wherein said originating gateway computer comprises an originating buffer component for storing said return packets prior to conversion thereof into said second return signals.

7. A telecommunications system according to claim 6, wherein said originating gateway computer further comprises a component for rearranging said stored return packets to maintain a proper packet order.

8. A telecommunications system according to claim 1, wherein at least one of said routing components comprises an address resolution logic and a network routing database implemented with a central processing unit.

9. A telecommunications system according to claim 1, wherein said originating gateway computer includes a component for providing a ring back tone or a busy tone to a telephone connected to said originating circuit-switched network.

10. A telecommunications system according to claim 1, wherein said originating gateway computer includes a component for providing out of band signaling between said originating gateway computer and said originating circuit-switched network.

11. A telecommunications system comprising:
an originating gateway computer for providing digital packets corresponding to originating signals produced in response to voice input,
a gateway computer that accepts out of band signaling and converts said digital packets into terminating signals,
a circuit-switched network for providing voice output in response to said terminating signals, and
a packet-switched network for transmitting said digital packets from said originating gateway computer to said gateway computer, at least one of said originating gateway computer or said gateway computer comprising a component for routing said digital packets through said packet-switched network from said originating gateway computer to said gateway computer:
wherein said circuit-switched network is capable of providing first return signals to said gateway computer,
wherein said gateway computer comprises a component for converting said first return signals into packets of return digital data,
wherein at least one of said originating gateway computer or said gateway computer comprises a component for routing said return packets through said packet-switched network from said gateway computer to said originating gateway computer,
and wherein said originating gateway computer comprises a component for converting said return packets into second return signals.

12. A telecommunications system according to claim 11, wherein said gateway computer comprises a buffer component for storing said digital packets prior to the conversion thereof into said terminating signals.

13. A telecommunications system according to claim 12, wherein said gateway computer further comprises a component for rearranging said stored digital packets to maintain a proper packet order.

14. A telecommunications system according to claim 11, wherein said routing component provides said routing in response to data received from said gateway computer.

15. A telecommunications system according to claim 11, wherein said routing component provides said routing in response to a typed input from a computer keyboard.

16. A telecommunications system according to claim 11, wherein said originating network comprises a buffer component for storing said return packets prior to conversion thereof into said second return signals.

17. A telecommunications system according to claim 16, wherein said originating network further comprises a component for rearranging said stored return packets to maintain a proper packet order.

18. A telecommunications method comprising:
providing originating digital packets for transmission from an originating gateway computer, said originating digital packets corresponding to originating signals produced in response to originating voice input;
routing said originating digital packets from said originating gateway computer to a gateway computer, that accepts out of band signaling, through a packet-switched network via an originating routing component in at least one of said originating gateway computer or said gateway computer;
converting said originating digital packets into terminating signals for transmission from said gateway computer;
transmitting said terminating signals through a circuit-switched network for providing terminating voice output in response to said terminating signals;
providing first return signals to said gateway computer in response to return voice input into said circuit-switched network;
converting said return signals into return digital packets of return digital data for transmission from said gateway computer;
routing said return digital packets through said packet-switched network from said gateway computer to said originating gateway computer using said originating routing component or another routing component in said originating gateway computer or said gateway computer;
and converting said return digital packets into second return signals.

19. The telecommunications method of claim 18, where at least one of the originating digital packets or the return digital packets are routed using an address resolution logic and a network routing database implemented with a central processing unit.

20. The telecommunications method of claim 18, further comprising:
providing a ring back or busy tone to a telephone connected to the originating gateway computer through an originating network in response to signaling from a component of the originating gateway computer.

* * * * *